US 8,240,869 B2

(12) United States Patent
Johnson et al.

(10) Patent No.: US 8,240,869 B2
(45) Date of Patent: Aug. 14, 2012

(54) EQUESTRIAN LIGHT APPARATUS

(76) Inventors: Roberta Johnson, Crystal Falls, MI (US); Clint Johnson, Dousman, WI (US)

( * ) Notice: Subject to any disclaimer, the term of this patent is extended or adjusted under 35 U.S.C. 154(b) by 196 days.

(21) Appl. No.: 12/756,756

(22) Filed: Apr. 8, 2010

(65) Prior Publication Data
US 2010/0259922 A1 Oct. 14, 2010

Related U.S. Application Data

(60) Provisional application No. 61/168,140, filed on Apr. 9, 2009.

(51) Int. Cl.
*F21V 21/084* (2006.01)
(52) U.S. Cl. .......... 362/105; 362/191; 54/79.2; 119/859
(58) Field of Classification Search .................. 362/103, 362/105, 108, 190, 191; 119/858, 859; 54/6.1, 54/24, 79.2; 116/63 P, 202
See application file for complete search history.

(56) References Cited

U.S. PATENT DOCUMENTS

| 1,057,529 | A | | 4/1910 | Cloninger | |
|---|---|---|---|---|---|
| 4,875,145 | A | * | 10/1989 | Roberts | 362/103 |
| 5,115,382 | A | * | 5/1992 | Smith | 362/105 |
| 5,169,702 | A | | 12/1992 | Schell | |
| 5,630,382 | A | * | 5/1997 | Barbera et al. | 119/859 |
| 5,775,970 | A | * | 7/1998 | Klees et al. | 446/297 |
| 6,086,213 | A | | 7/2000 | Holce | |
| 6,302,554 | B1 | | 10/2001 | Holce | |
| 6,574,948 | B2 | * | 6/2003 | Longtin | 54/79.2 |
| 6,575,587 | B2 | * | 6/2003 | Cramer et al. | 362/105 |
| 6,865,285 | B1 | * | 3/2005 | Villa-Aleman | 382/124 |
| 6,877,875 | B2 | * | 4/2005 | Yu et al. | 362/105 |
| 7,536,980 | B2 | * | 5/2009 | Cooper | 119/795 |
| 2003/0061790 | A1 | * | 4/2003 | Longtin | 54/79.2 |
| 2005/0044823 | A1 | | 3/2005 | Collins | |
| 2005/0099796 | A1 | | 5/2005 | Magee | |
| 2005/0225964 | A1 | | 10/2005 | Simoni | |
| 2007/0086182 | A1 | | 4/2007 | Kelly | |

* cited by examiner

*Primary Examiner* — John A Ward
(74) *Attorney, Agent, or Firm* — Absolute Technology Law Group, LLC

(57) ABSTRACT

The present invention is an equestrian light device comprised of a plurality of lighting elements which can be secured to the bridle, saddle, stirrups and other pieces of tack, and which provides a rider with the ability to view a path before the turning of a horse to go down the path, in addition to illuminating a zone of safety to provide a rider with adequate visibility to discern obstacles that may impede the progress of a horse on a path, or which may startle or injure the animal or rider.

20 Claims, 4 Drawing Sheets

EQUESTRIAN LIGHT APPARATUS

CROSS-REFERENCE TO RELATED APPLICATIONS

This application claims priority to U.S. Provisional Application No. 61/168,140 filed on Apr. 9, 2009.

FIELD OF INVENTION

The present invention relates to the field of equestrian equipment and more particularly to the field of equestrian light devices used to illuminate the path of a rider.

GLOSSARY

Figure 1:
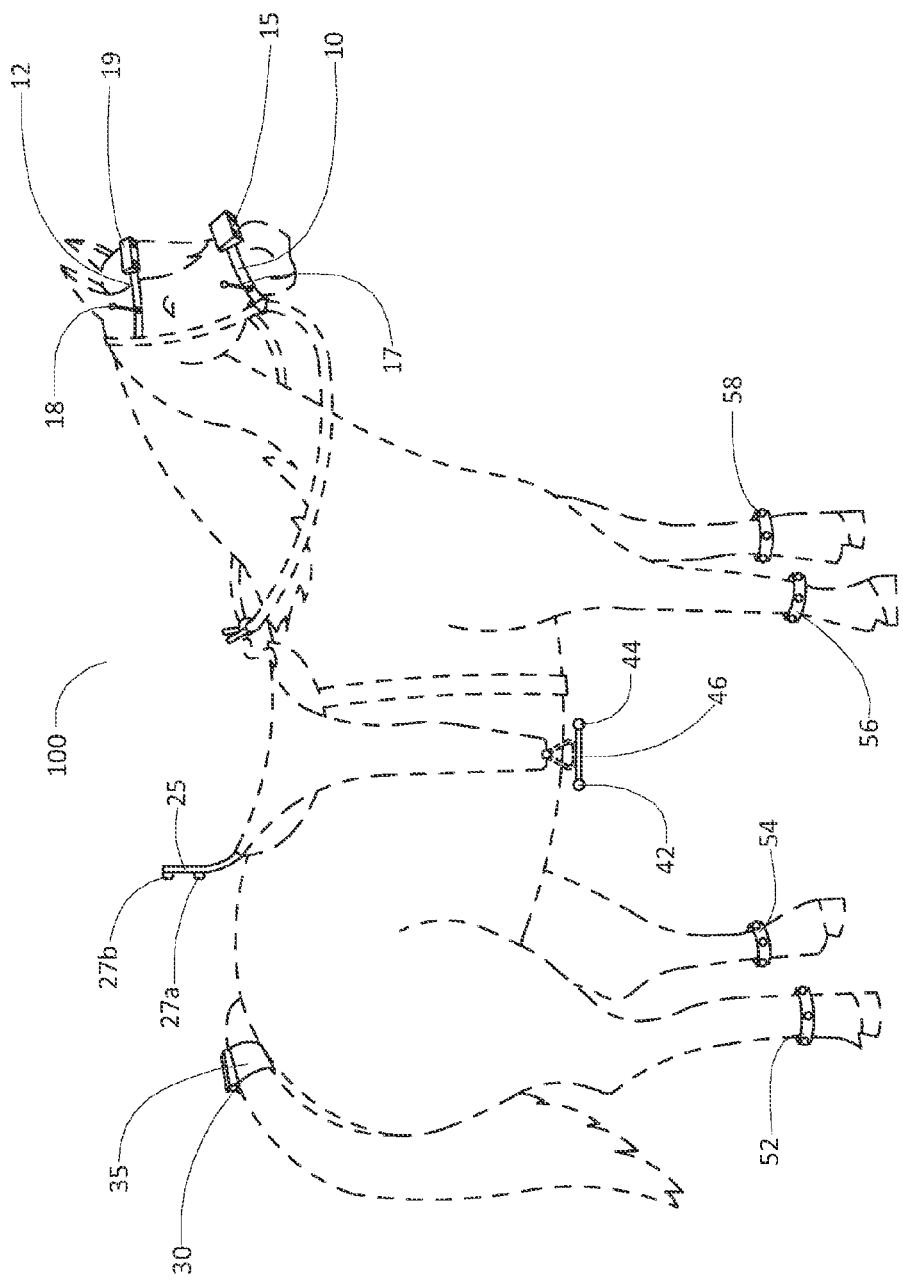
FIG. 1 illustrates a side view of a horse wearing a bridle, saddle and stirrups fitted with an exemplary embodiment of an equestrian light apparatus.

As used herein, the term "path" or "trail" refers to any road, lane or course on which a horse may travel, whether or not marked or designated.

As used herein the term "stirrup" refers to any device which is attached or suspended from a saddle, and which may or may not operate as a foot rest.

As used herein, the term "light" refers to any incandescent light, LED light, fluorescent light source, chemical light source, solar light source and/or reflective light source (or any combination thereof) known in the art.

As used herein, the term "light control" or "path illumination control" refers to a component which allows the user to balance the level of path illumination with the vision interference tolerance of the animal by adjusting the intensity of a light. For example, a light control may allow the user to switch between high-beam to low-beam settings.

As used herein, the term "beam deflection component" refers to a component of a light that projects the path of light in a particular direction (e.g., away from an animal's eyes).

As used herein, the term "saddle" refers any device which is placed on a horse to facilitate the riding of a horse or transport of gear. A saddle may include any number of hooks, rings, straps, stirrups, compartments, tack, bridle, halters, packs, storage areas, surfaces, padding, snaps, ties or other components known in the art and capable of being attached to a saddle.

As used herein, the term "rear saddle light support" refers to a structure secured to a saddle to which at least one light is attached.

As used herein, the term "bridle" refers to a harness or piece of equipment used to direct a horse.

As used herein, the term "browband" refers to the part of the bridle that runs from just under one ear of the horse, across the forehead, to just under the other ear.

As used herein, the term "noseband" refers to the part of the bridle that encircles the nose of the horse.

As used herein, the term "headpiece" refers to the part of the bridle that goes over the horse's head just behind the animal's ears.

As used herein, the term "cheekpiece" refers to the part of the bridle that attaches to either side of the headpiece and runs down the side of the horse's face.

As used herein, the term "central forehead point" refers to a location on an animal's forehead equidistance between an animal's eyes.

As used herein, the term "tack" refers any strap used to facilitate the sport of horseback riding, and which may located anywhere on a horse or rider, and made of any length, width, thickness or material known in the art.

As used herein, the term "equestrian light apparatus" or "equestrian light device" refers to a component to which lights have been mounted, and/or fixedly or selectively attached to provide an area of illumination to facilitate horse back riding.

As used herein, the term "power source" refers to a component capable of providing electricity or another source of power to lights used on an equestrian light apparatus, including but not limited to any battery, generator, solar power source or reactive chemical.

As used herein, the term "area of illumination" refers to a region or object which is illuminated (e.g., a path) or made visible (e.g., a horse and rider) by an equestrian light apparatus.

BACKGROUND

Horseback riding is a popular sport in the United States and in Europe with a substantial market for equipment, facilities, trail fees and fees paid by people who do not own horses to engage in the sport.

Many Americans who participate in horseback riding own their own equipment, but not necessarily their own horse. Additionally, recreational horseback riders have leisure time limited by their working hours, and this time is often on weekends and evenings.

A 2007 study conducted by Horseman of America magazine revealed the following statistics:

- There are currently 123,799 miles of public trail for recreational and pack horse back riding available on federal and state land in the lower 48 states. Of this land, 85% of the trail mileage is on federal land and 69% of that is managed by the USDA Forest Service.
- There are approximately 9.1 million horses owned in the United States alone, and of those approximately 3.9 million are privately owned for recreation.

Additional studies indicate that there are over five to seven million horse stables in the United States, and these stables require a considerable amount of money to maintain (board) the horses and staff. Other expenses associated with horse maintenance include veterinary bills, food, and routine care such as hoof trimming.

To defray the costs of maintaining the horses, many stables offer the horses for recreational use for a fee.

Horseback riding is a sport that involves inherent risk, and most professional stables must maintain insurance and take steps to minimize risk.

Riding horses at night can increase the risk of injury to the animal and the rider because impaired vision means that obstacles that may frighten, injure or impair the movement of the horse (particularly on an unfamiliar or public trail) may result in the horse acting precipitously.

Additionally, horses and riders may not be visible to oncoming traffic, and it may be difficult to locate fellow riders who become lost or stray from the trail at night.

Lighting devices designed for horseback riding are known in the art. One such device, disclosed in U.S. patent application Ser. No. 10/902,238, consists of a plurality of illumination means fitted to a bridle. The lights are wired to a power source equipped with a switch to connect and disconnect the power source from the lights. The lights are mounted on the front sheath and/or the breast collar portions of the bridle. Due to the placement of the lights, the lights will not illuminate the upcoming path. It is desirable to have a light or plurality of lights which illuminate the path ahead of the horse and rider.

A lighting device which illuminates the path in front of the horse is disclosed in U.S. patent application Ser. No. 11/251,413 (Kelly '413). Kelly '413 discloses a horse headlight contained in a specially designed pouch that secures the lighting apparatus. The headlight secures to the breast collar portion of the tack using the straps of the pouch. When secured, the headlight illuminates the path in front of the horse. It is desirable to have a light device that also illuminates the direction in which the horse's head is turned, not just the direction in front of the horse's body.

In addition, due to the size and placement of the headlight on the breast collar, the device may rub against the horse's legs or interfere with the horse's gait when secured. The placement of the headlight on the breast collar is further complicated by the varying styles and fittings of breast collars.

It is desirable to have a lighting device which does not interfere with the horse's movement and which fits equally well on all types and styles of equipment.

It is further desirable to have an apparatus which increases the number of hours in a day for participation in horseback riding, regardless of daylight conditions, and which may thus increase revenue for stable owners through collection of additional trail fees.

It is further desirable to have a device which increases visibility and safety for horses and riders by illuminating trails and paths in a manner that allows a rider and horse sufficient time to react to obstacles and hazards which may be illuminated.

It is further desirable to ensure that riders and horses are visible to traffic, and can easily be found on dark or isolated trails should they become lost or injured, or should a horse run away at night.

It is further desirable to have a device that illuminates in all directions and can be seen from a far distance.

It is further desirable to have a lighting device that is lightweight, compact, comfortable for the horse, and easy to mount and remove.

It is further desirable to have a battery pack that can be mounted to the saddlebag for the comfort of the horse and rider.

It is further desirable to have a lighting device that is inexpensive to manufacture.

It is further desirable to have a choice of materials, such as lightweight straps, LED lights and the materials for the mounted pack.

SUMMARY OF INVENTION

The present invention is an equestrian light device comprised of a plurality of lighting elements which can be secured to the bridle, saddle, stirrups and other pieces of tack, and which provides a rider with the ability to view a path before turning a horse to go down the path, in addition to illuminating a zone of safety to provide a rider with adequate visibility to discern obstacles that may impede the progress of a horse on a path, or which may startle or injure the animal and/or rider.

DETAILED DESCRIPTION OF INVENTION

For the purpose of promoting an understanding of the present invention, references are made in the text to exemplary embodiments of an equestrian light device, only some of which are described herein. It should be understood that no limitations on the scope of the invention are intended by describing these exemplary embodiments. One of ordinary skill in the art will readily appreciate that alternate but functionally equivalent components, materials, and placement may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 is an illustration of an exemplary embodiment of equestrian light device 100. In various embodiments, lights shown herein as components of equestrian light device 100 may have separate, individually controlled power sources and switches, or combined power sources and/or switches.

FIG. 1 illustrates noseband light 15 secured to noseband 10 and forehead light 19 secured to browband 12. Noseband light 15 and forehead light 19 provide an area of illumination in front of the horse and rider. In the embodiment shown, noseband light 15 has a separate nose beam control 17 for high beam and low beam settings, but various embodiments may include or omit this feature. Additionally, nose beam control 17 may be located anywhere on equestrian light device 100. Similarly, forehead light 19 has forehead light control 18 but various embodiments may include or omit this feature. Additionally, forehead light control may be located anywhere on equestrian light device 100.

In various other embodiments, one or more lighting components of equestrian light device 100 may include a beam deflection component which directs the light in a particular direction. For example, noseband light 15 and forehead light 19 may include a beam deflection component which directs the light away from the animal's eyes.

In the embodiment shown, equestrian light device 100 further includes rear saddle light support 25, which includes at least one rear saddle light 27. Rear saddle light 27 may be white, red, or a light of any color or intensity.

In the embodiment shown, read saddle light support 25 of equestrian light device 100 includes two rear saddle lights 27a, 27b. In other embodiments, rear saddle light support 25 may include more or fewer saddle lights, and/or saddle lights of any shape, configuration, or type known in the art.

In the embodiment shown rear saddle light support 25 is a solid or hollow bracket or pole structure for supporting rear saddle lights 27a, 27b, but in other embodiments may be folding and/or telescoping, or may be capable of selective removal for storage.

FIG. 1 further illustrates optional stirrup lights 42, 44 attached by one or more stirrup bands 46. Stirrup bands 46 may be any band, clip or strap known in the art capable of affixing optional stirrup lights 42, 44 to a stirrup, and in which wiring may be embedded or attached.

Also shown in FIG. 1 are optional hoof lights 52, 54, 56, 58 which are selectively attached between the ankle and knee of a horse by any band, clip or strap known in the art-capable of affixing hoof lights to a horse's lower leg, and in which wiring may be embedded or attached. In the embodiment shown, each optional hoof light 52, 54, 56, 58 has a separate, individually controlled power sources and switch, but in other embodiments may be powered by one or more power sources or controlled by one or more switches.

In the embodiment shown, equestrian light device 100 further includes optional tail light 30 and optional tail band 35 which secures optional tail light 30 to a horse's tail. Optional tail band 35 may be any band, clip or strap known in the art capable of affixing optional tail light 30 to a horse's tail, and in which wiring may be embedded or attached.

Noseband light 15, forehead light 19, rear saddle lights 27a, 27b, optional stirrup lights 42, 44, optional tail light 30, and optional hoof lights 52, 54, 56, 58 provide an area of illumination that projects in all directions illuminating the path of the horse and rider as well as making the horse and rider visible to others (e.g., other riders, passing motorists).

In the embodiment shown, noseband light 15, forehead light 19, rear saddle lights 27a, 27b, optional stirrup lights 42, 44, optional tail light 30, and optional hoof lights 52, 54, 56, 58 are LED lights; however, in other embodiments may be incandescent lights, fluorescent lights, chemical light sources, solar light sources, reflective sources, or any other light source known in the art or combinations thereof.

In the embodiment shown, noseband light 15, forehead light 19, rear saddle lights 27a, 27b, optional stirrup lights 42, 44, optional tail light 30, and optional hoof lights 52, 54, 56, 58 each have their own power source; however, in other embodiments, one or more lights or lighting elements may share the same power source.

In various embodiments, the size, weight, color and shape of the lights will vary based on the specific placement of the lights and the particular function (e.g., illumination, reflection) required or desired by the rider. In addition, the lights may be contoured to correspond to the curvature of a particular piece of tack or other component. For example, noseband light 15 and forehead light 19 may be contoured to correspond to the curvature of noseband 10 and browband 12, respectively, when worn by a horse.

In various embodiments, the lights are secured to the tack or other component (e.g., browband, noseband, rear saddle light support, tail band) by ties, stitching, hook-and-loop fasteners, clips, elastic straps, clamps, hooks, wing nuts, pins, glue or any other securing means known in the art.

Equestrian light device 100 may be adapted for use with any animal. For example, components described herein (e.g., hoof lights) may be placed on other animals (e.g., dogs, cats, farm animals) with or without the use of leashes or harnesses from which to suspend power sources and/or wiring.

Alternate embodiments of equestrian light device 100 may have lights or lighting components placed anywhere (e.g., on the cheekpiece or reins of the bridal) and may be connected by wiring, and one skilled in the art will understand that alternate embodiments may have more, fewer or alternate types of light sources.

Figure 2:
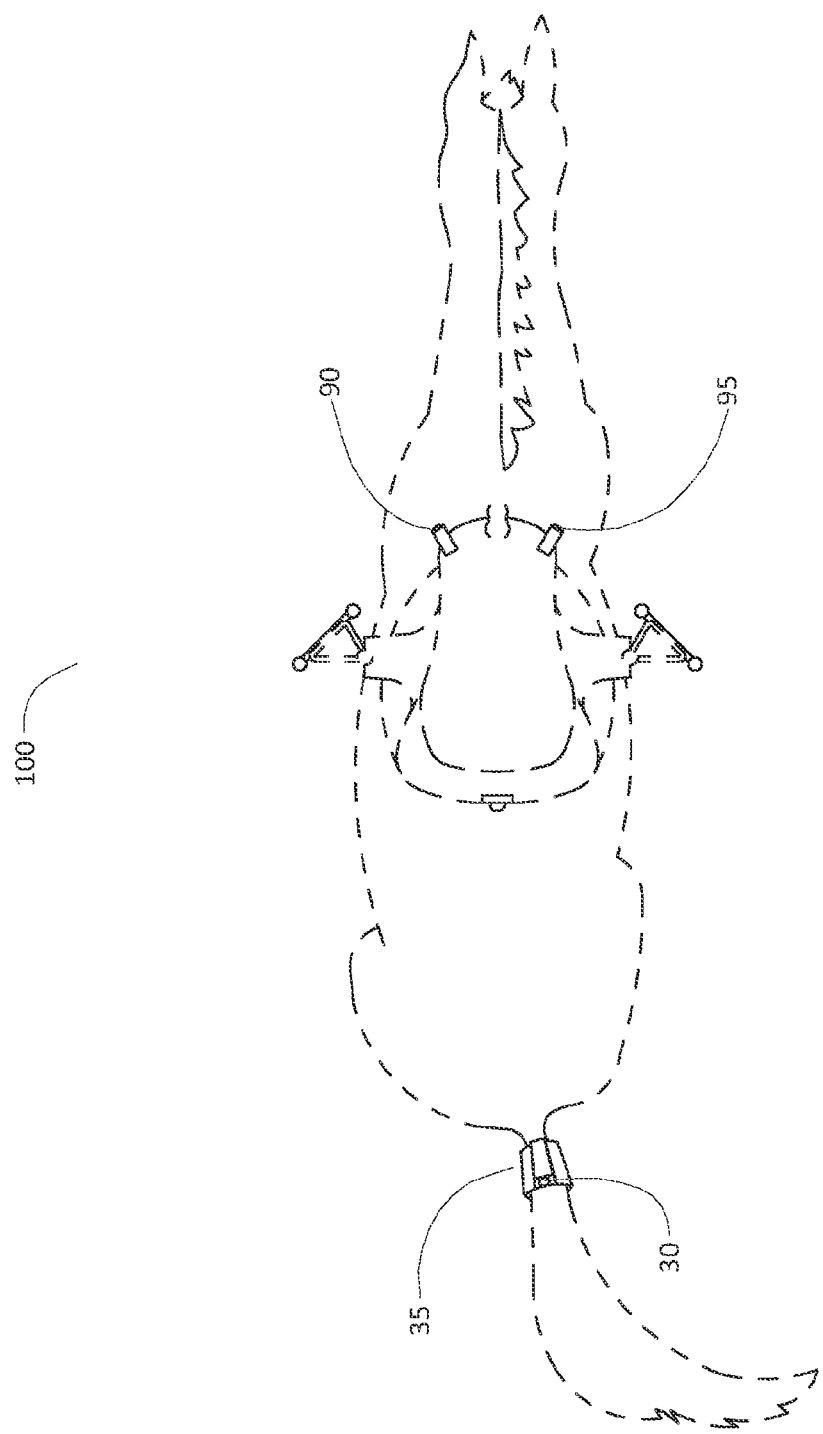
FIG. 2 illustrates a top view of a horse wearing a bridle, saddle and stirrups fitted with an alternate exemplary embodiment of an equestrian light apparatus.

FIG. 2 illustrates a top view of an alternate exemplary embodiment of equestrian light device 100 which includes saddle horn lights 90, 95. Also included are optional stirrup lights 42, 44, stirrup bands 46, optional tail light 30 and optional tail band 35.

Figure 3:
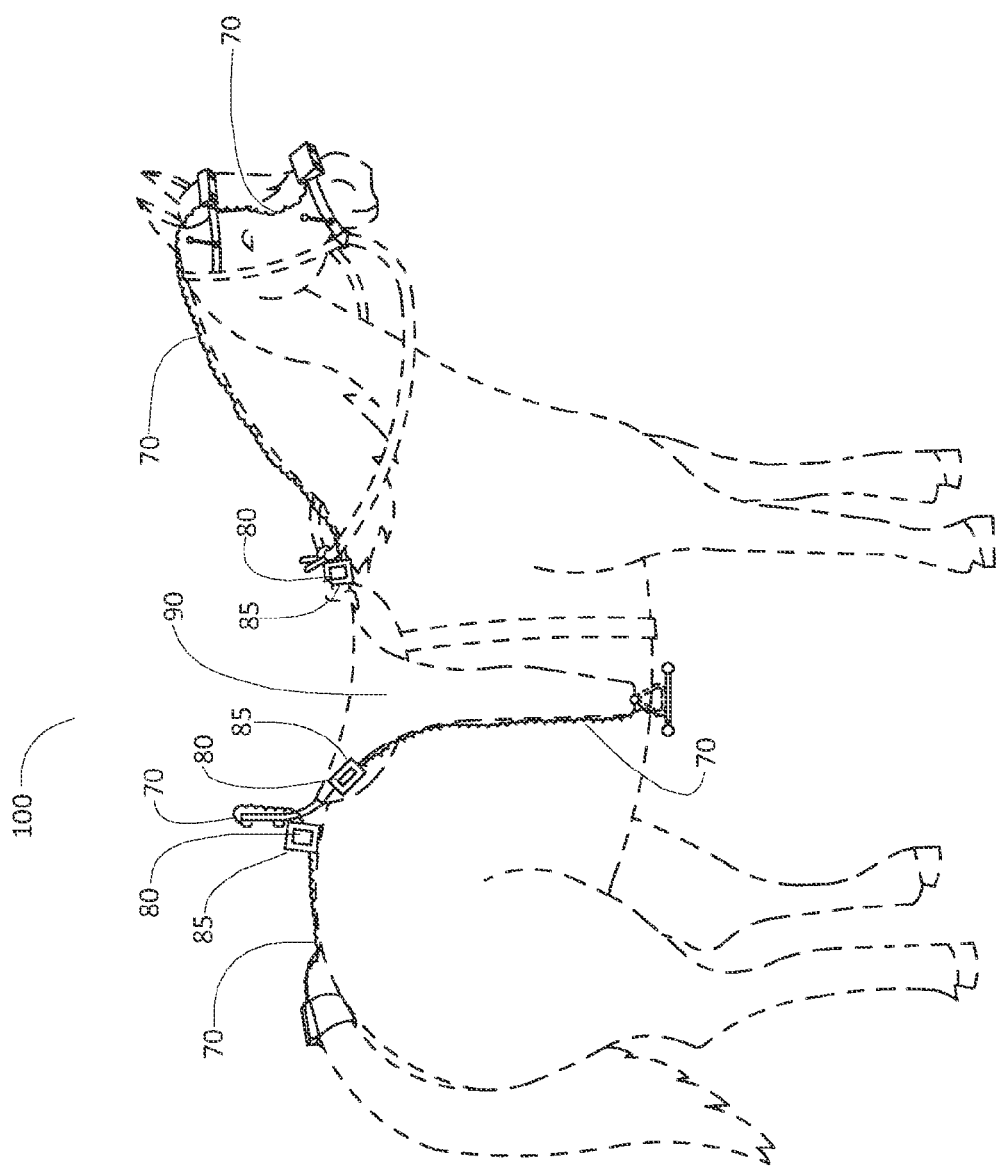
FIG. 3 illustrates a side view of a horse wearing a bridle, saddle and stirrups fitted with an alternate exemplary embodiment of an equestrian light apparatus.

FIG. 3 illustrates a side view of an alternate exemplary embodiment of equestrian light device 100 which further includes power sources 80 which connect various configurations of lights using insulated wires 70. In the embodiment shown, power sources 80 are batteries enclosed within battery case 85 which is adapted to be selectively mounted anywhere on or adjacent to saddle 90.

In the embodiment shown, power sources 80 are used to power noseband light 15, forehead light 19, rear saddle lights 27a, 27b, optional stirrup lights 42, 44, and optional tail light 30. In other embodiments, there may be more or fewer power sources 90 and/or alternative configurations of insulated wires 70 or non-wired elements. In other embodiments, equestrian light device 100 has more or fewer lighted elements.

Figure 4:
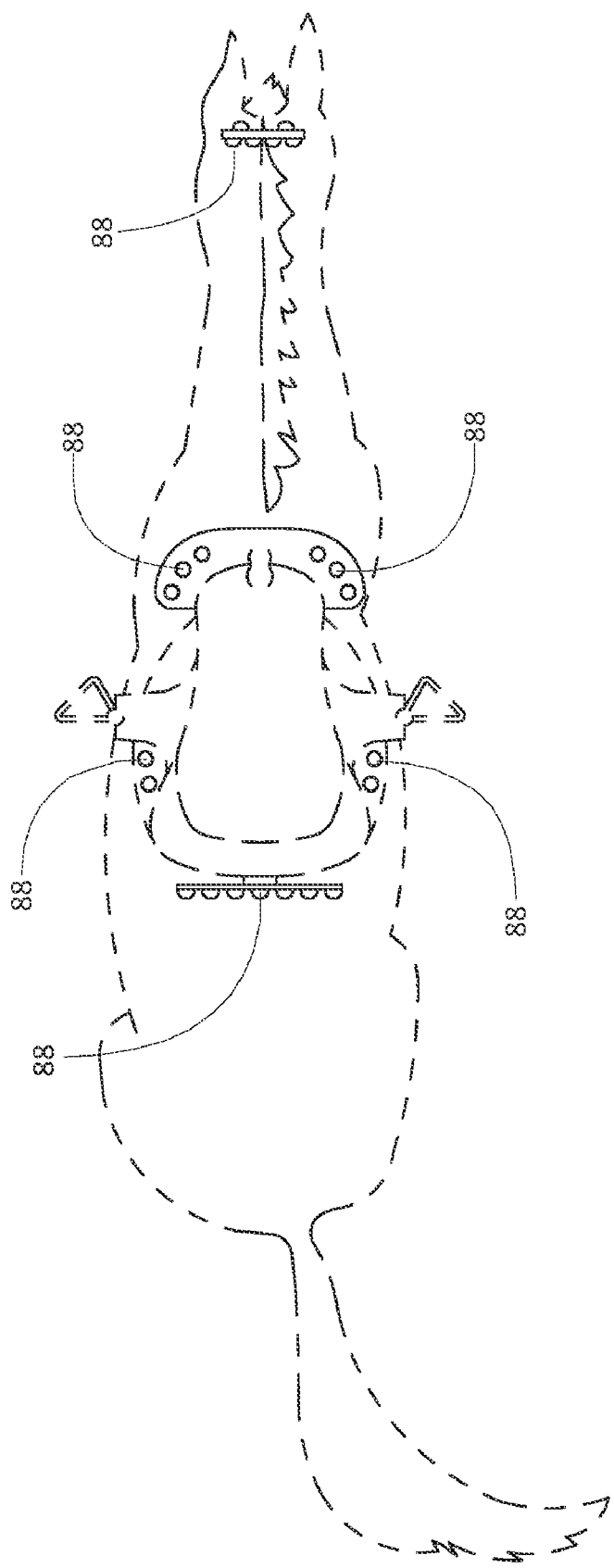
FIG. 4 illustrates a top view of a horse wearing a bridle, saddle and stirrups fitted with an exemplary embodiment of an equestrian light apparatus adapted for use by law enforcement and security personnel.

FIG. 4 illustrates an alternate exemplary embodiment of equestrian light device 100 adapted for use by law enforcement and security personnel, which includes high-visibility lights 88 in single or multiple colors. In the embodiment shown, high-visibility lights 88 are secured to the headpiece of the horse's bridle and the saddle, but in other embodiments may be placed in additional or alternate locations, such as other locations on the bridal, the stirrups, the horse's lower legs, and the horse's tail.

In various embodiments of equestrian light device 100, the lights may be flashing, capable of being activated remotely, color-coded, or have features which provide a beaconing effect.

The invention claimed is:

1. An path illumination apparatus comprised of:
   at least one forehead light secured at a central forehead point one to three inches above the eyes of an animal;
   a path illumination control which allows a user to balance the level of path illumination with the vision interference tolerance of an animal;
   at least one noseband light;
   a rear saddle light support having at least one rear saddle light; and
   at least one power source.

2. The apparatus of claim 1, which further includes insulated wire which connects said at least one power source to said at least one forehead light, said at least one noseband light, and said at least one rear saddle light.

3. The apparatus of claim 1, wherein each of said at least one forehead light, said at least one noseband light, and said at least one rear saddle light has its own power source.

4. The apparatus of claim 1, which further includes a noseband light control.

5. The apparatus of claim 1, which further includes a tail band having at least one tail light.

6. The apparatus of claim 1, which further includes a stirrup band having at least two stirrup lights.

7. The apparatus of claim 1, which further includes hoof lights.

8. The apparatus of claim 1, which further includes saddle horn lights.

9. The apparatus of claim 1, wherein said at least one forehead light, said at least one noseband light, and said at least one rear saddle light are selected from a group consisting of LED lights, incandescent lights, fluorescent lights, chemical light sources, solar light sources, reflective sources, and combinations thereof.

10. The apparatus of claim 1, wherein said at least one forehead light, said at least one noseband light, and said at least one rear saddle light are high-visibility lights.

11. The apparatus of claim 1, wherein said at least one forehead light, said at least one noseband light, and said at least one rear saddle light are white lights.

12. The apparatus of claim 1, wherein said at least one forehead light, said at least one noseband light, and said at least one rear saddle light are red lights.

13. The apparatus of claim 1, wherein said at least one power source is selected from a group consisting of batteries, generators, solar power sources, and reactive chemicals.

14. The apparatus of claim 1, wherein each of said at least one forehead light, said at least one noseband light, and said at least one rear saddle light weigh less than 1 ounce.

15. The apparatus of claim 1, wherein said at least one forehead light, said at least one noseband light, and said at least one rear saddle light are secured using a component selected from a group consisting of ties, stitching, hook-and-loop fasteners, clips, elastic straps, clamps, hooks, wing nuts, pins, and glue.

16. The apparatus of claim 1, wherein said at least one forehead light is contoured to correspond to the curvature of a browband when worn by a horse and said at least one noseband light is contoured to correspond to the curvature of a noseband when worn by a horse.

17. The apparatus of claim 1, wherein each of said at least one forehead light, said at least one noseband light, and said at least one rear saddle light is separately controlled.

18. The apparatus of claim 1, wherein said at least one forehead light further includes a beam deflection component.

19. An area illumination device apparatus comprised of:
at least one forehead light;
a forehead light control;
at least one noseband light;
a rear saddle light support having at least one rear saddle light;
a tail band having at least one tail light;
at least one saddle horn light;
a stirrup band having at least two stirrup lights;
a plurality of hoof lights;
at least one power source enclosed in a case; and
insulated wire which connects said at least one power source to said at least one forehead light and said at least one noseband light.

20. The apparatus of claim 19, which further includes a noseband light control.

\* \* \* \* \*